United States Patent [19]

Vaillant De Guelis et al.

[11] Patent Number: 4,872,357
[45] Date of Patent: Oct. 10, 1989

[54] DEVICE FOR TEMPORARILY LOCKING A ROTOR ONTO A STATOR

[75] Inventors: Hubert Vaillant De Guelis, Aubergenville; Jean-Louis Joly, Bazemont, both of France

[73] Assignee: Aerospatiale Societe Nationale Industrielle, Paris, France

[21] Appl. No.: 227,932

[22] Filed: Aug. 3, 1988

[30] Foreign Application Priority Data

Aug. 5, 1987 [FR] France .............................. 87 11136

[51] Int. Cl.$^4$ .............................................. G01C 19/26
[52] U.S. Cl. ....................................................... 74/5.1
[58] Field of Search ..................... 74/5.1, 5.12, 5.14; 244/165

[56] References Cited

U.S. PATENT DOCUMENTS

| 4,211,452 | 7/1980 | Poubeau | 244/165 X |
| 4,322,984 | 4/1982 | Lasker et al. | 74/5.12 X |
| 4,345,485 | 8/1982 | Livet et al. | 74/5.1 |

FOREIGN PATENT DOCUMENTS

| 2549598 | 1/1985 | France . | |
| 2033977 | 5/1980 | United Kingdom | 244/165 |

OTHER PUBLICATIONS

"Satellite Flywheels with Magnetic Bearings and Passive Radial Centering", Poubeau, *J. Spacecraft* vol. 17 No. 2, Article #78-571R, pp. 93-98, Mar.-Apr., 1980.

*Primary Examiner*—Rodney H. Bonck
*Attorney, Agent, or Firm*—Browdy & Neimark

[57] ABSTRACT

A device for temporarily locking onto a stator a rotor that normally rotates on the stator on magnetic bearings (such as an inertia wheel in a space satellite) includes a frustoconical bearing surface near the periphery of the rotor and a complementary frustoconical bearing surface on the stator. The rotor bearing surface is axially engaged with the stator bearing surface by a cable forming an annular loop in a transverse plane. A device is provided for releasing this cable. A plurality of radially mobile elementary bearing surfaces are coupled to the stator and there is a second bearing surface at the periphery of the rotor. These elementary bearing surfaces are axially engaged with the second bearing surface on the rotor, against the action of a return spring arrangement, in the direction opposite that in which the conical bearing surface on the stator applies an axial engagement force to the frustoconical bearing surface on the rotor.

16 Claims, 4 Drawing Sheets

DEVICE FOR TEMPORARILY LOCKING A ROTOR ONTO A STATOR

BACKGROUND OF THE INVENTION

1. Field of the invention

The invention concerns the temporary locking onto a stator of a rotor that normally rotates on the stator on magnetic bearings. It is particularly, but not exclusively, concerned with locking an inertia wheel of a space satellite in position.

2. Description of the prior art

When a satellite is launched and injected into its orbit, it is subjected to varied and high mechanical loads. These subject any inertia wheel on board the satellite to sinusiodal and/or random vibration on each axis (rotation axis and two transverse axes completing a reference trihedron).

Because of their magnitude these loads cannot be satisfactorily absorbed by the magnetic (and therefore mechanical contact-free) bearings. It is therefore known to temporarily lock the inertia wheel to the remainder of the satellite structure forming a stator, by mechanical means, during the launching of the satellite. Locking systems designed to this end must prevent any problems of binding due to rubbing and/or jamming which may occur at the time of release in the space type but nevertheless severe environment.

A first locking system designed for this purpose described by ESTEC in "Experimental Caging Mechanism" (cf. Gen. Arrgt. Drg No. 1 300, Oct. 1982) resembles a drum brake with two jaws which are spread apart radially and pressed against an internal cylindrical portion at the periphery of the rotor, due to the mechanical action of a circumferential cable the tension in which is transferred to the jaws by two sets of links. In the locked configuration the rotor is immobilized by the tangential friction exerted on it by the jaws; to release the rotor the locking cable is cut by a pyrotechnic cable cutter and return springs pull the jaws to a radially retracted configuration.

For such locking by tangential friction to be effective, the locking cable must be at a high tension and remain at this high tension in spite of relaxation phenomena which occur in it. Also, the locking forces are very unevenly distributed since they are located at the diametrally opposed jaws. Furthermore, the path of the cable is relatively complex, departing from a simple path near the jaws and having very small radii of curvature; although these small radius of curvature areas can be sheated, they are inevitably subjected to friction which is prejudicial both to correct tensioning of the cables at the jaws when locked and to clean releasing of the jaws when the cable is cut; finally, no redundancy is provided in the cable release means.

In a second known locking system (cf. French Pat. No. 2.549.598) developed by AEROSPATIALE, the rotor is bell-shaped at its periphery and annular chamfers are formed on the stator and on the rotor, near the periphery of the latter, adapted to come into axial bearing engagement due to the action of a central cable disposed along the rotation axis of the rotor and tensioned to effect the locking. Release is similarly effected by cutting the cable using a pyrotechnic device.

A system of this kind exerts the locking forces at the center, that is to say at a location where the moments of inertia are the lowest, which can result in the rotor lifting off the stator at the periphery. Good locking requires a high tension in the cable, as previously. Finally, in this system there is no mechanical redundancy in the cable release means.

In a third type of locking device, also developed by AEROSPATIALE, a clamp fastens together two axially opposed flanges attached to the rotor and the stator, respectively. This clamp is formed by two jaws each articulated at one end about an axis parallel to the rotation axis of the rotor and subtending an angle of slightly less than 180° around the flanges; their other ends are joined by a tensioned cable which tends to pull them towards each other against a separator spring around the cable. Two grooves are formed on the radially inside wall of these jaws to accommodate the aforementioned flanges. Cable release is effected by a pyrotechnic cable cutter and the jaws are forced apart by the compressed spring.

A solution of this kind is very costly because of the need to shape the grooves to the exact complementary profile of the flanges. Also, locking requires a very high tension in the cable which generally results in deformation of the jaws. Once again their is no mechanical redundancy.

In a fourth type of locking device, also developed by AEROSPATIALE, disclosed in French Pat. No. 2.452.693 and U.S. Pat. No. 4.345.485, locking is effected along only three axes, meaning that the rotor is not immobilized relative to the stator in rotation. Locking is effected by temporarily cancelling the axial clearance which normally exists at the ends of a central shaft of the rotor between axial bearing surfaces provided on the rotor and on the stator. The axial clearance is eliminated by rendering an axial bearing surface on the stator axially mobile towards the corresponding bearing surface on the rotor, by virtue of radial movement of a shim forming a ramp due to the action of a cable disposed radially and against the action of a return spring. A cable cutter is provided to perform the release function.

This solution is somewhat complex as it presupposes the provision on the rotor or on the stator near axial bearing surfaces of bearings adapted to withstand high dynamic axial loads to enable rotation of the rotor in the locked configuration. Also, the various sliding movements that occur produce friction leading to the risk of binding. Finally, there is no mechanical redundancy in the release means.

These known solutions give satisfaction but an object of the invention is to remedy their disadvantages. It is particularly directed to a cable-type locking device adapted to operate efficiently and homogeneously at the periphery of the rotor without requiring the tension in the cable to be either very high or perfectly controlled, and which involves only minimum friction on releasing, so that release is clean.

BACKGROUND OF THE INVENTION

The invention consists in a device for temporarily locking onto a stator a rotor that normally rotates on said stator on magnetic bearings, said device comprising a frustoconical bearing surface near the periphery of said rotor, a complementary frustoconical bearing surface on said stator, a cable forming an annular loop in a transverse plane by which said rotor bearing surface is axially engaged with said stator bearing surface, a device for releasing said cable, a plurality of radially mobile elementary bearing surfaces coupled to said stator, a second bearing surface at the periphery of said rotor, and return spring means against which said elementary bearing surfaces are axially engaged with said second bearing surface on said rotor in the direction opposite that in which said frustoconical bearing surface on said stator applies an axial engagement force to said frustoconical bearing surface on said rotor.

This arrangement procures locking at the periphery, where most of the mass of the rotor is located, which is highly favorable to good mechanical resistance to vibration. Also, because of the frustoconical shape of at least one of the pairs of axial bearing surfaces, this device procures very good locking along the rotation axis and in transverse planes because of the axial alignment of the two pairs of bearing surfaces provided on the rotor and on the stator. The subdivision of one of the axial bearing surfaces on the stator into a plurality of radially retractable elementary bearing surfaces enables correct homogeneous distribution of the locking forces and easy and clean release. The fact that the cable is operative on these elementary axial bearing surfaces in the radial direction makes the quality of locking relatively insensitive to the exact tension in the cable and does not require that this tension be very high.

The device preferably further comprises elastic tangs substantially parallel to the rotation axis of said rotor fixed to said stator at one end and carrying said elementary bearing surfaces at their opposite end, said tangs having an idle position spaced from said rotor and constiututing said return spring means. As these elementary bearing surfaces are carried by their return means, there are no articulations likely to bind at the time of release. These tangs (or "petals") are advantageously made from a composite material incorporating carbon fibers.

The elementary bearing surfaces and the second bearing surface on the rotor are preferably inclined relative to a transverse plane whereby the rotor is locked with a force proportional to the tension in the cable.

A plurality of (at least two) cable cutters are advantageously provided so that this redundancy renders release more secure. A cable cutter of this kind is preferably disposed near one elementary axial bearing surface on the flexible tang that carries it. A branch cable is preferably fixed to each side of the cutting area to prevent the cut ends of the cable moving in a random way.

The cable is advantageously a circular loop which facilitates cable release given the uniform curvature of the cable.

The cable is advantageously a closed loop having its free ends attached to the free ends of two links substantially parallel to the axis, articulated at their base and together forming a tensioner, being spread angularly in the direction tangential to the cable by a screw-and-nut system enabling the cable to be tensioned or detensioned manually.

It will be appreciated that a device in accordance with the invention is entirely external to the rotor in the axial direction, which enables easy mounting and replacement without working inside the rotor. This also provides for visual surveillance of the locking action.

The invention also consists in the application of this device to temporarily locking an inertia wheel on board a space satellite.

Objects, characteristics and advantages of the invention will emerge from the following description given by way of non-limiting example only with reference to the appended drawings

DESCRIPTION OF THE PREFERRED EMBODIMENT

Figure 1:
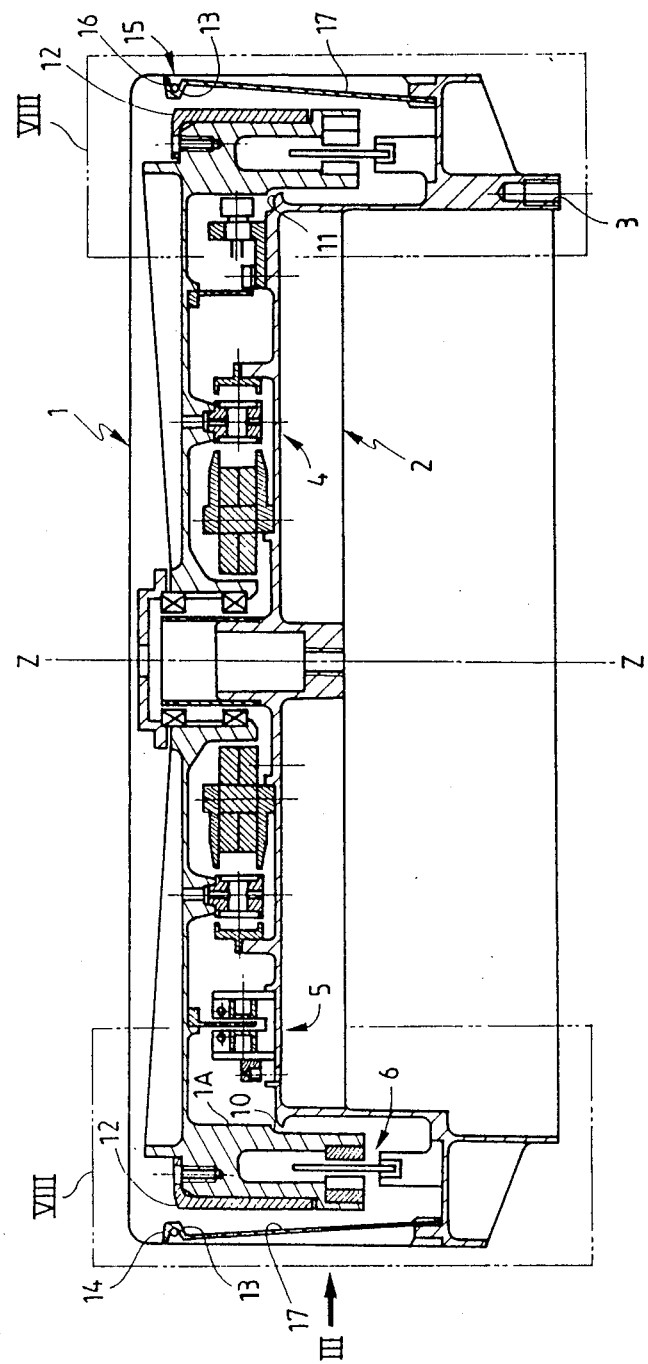
FIG. 1 is a schematic view in axial cross-section on the line I—I in FIG. 2 of an inertia wheel equipped with a locking device in accordance with the invention, shown in an unlocked configuration.
Figure 2:
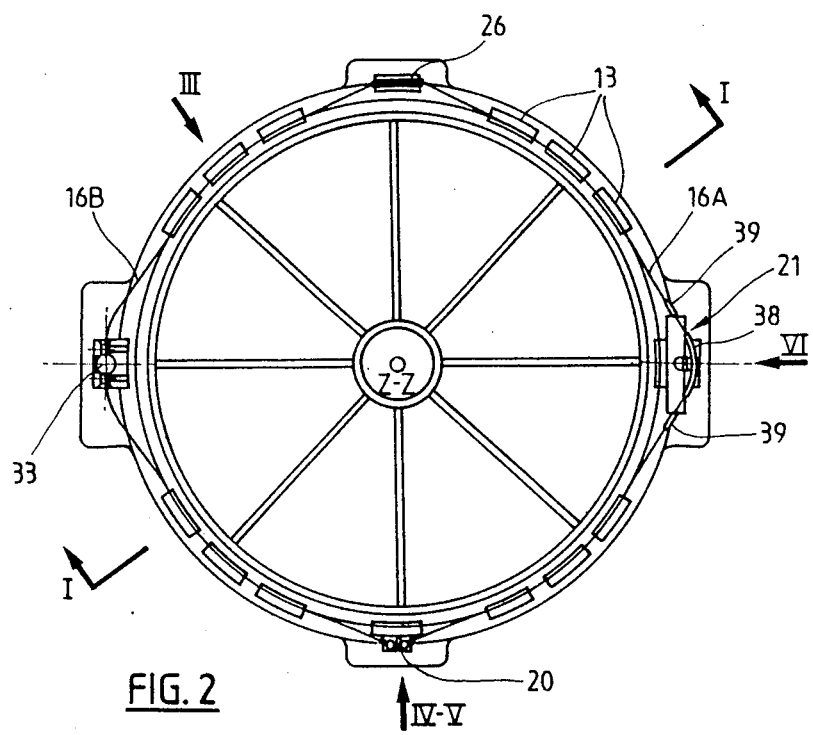
FIG. 2 is a schematic plan view of it in a locked configuration.

FIG. 1 is a simplified axial cross-section through an inertia wheel 1 formed by a bell-shaped rotor mounted on conventional magnetic bearings and including a massive peripheral ring 1A adapted to rotate about a rotation axis Z—Z relative to a stator 2 adapted to be fixed to the structure of a satellite (not shown) by bolts accommodated in bores 3.

The rotor 1 and the stator 2 are equipped in a known way with passive axial centering means 4 and active radial centering means 5 connected to radial speed sensors 5 and rotation drive means 6 of any appropriate type. As these means do not form any part of the invention they will not be described in detail.

Frustoconical bearing surfaces 10 and 11 are formed on the rotor near the peripheral ring 1A and on the stator, respectively; they are adapted to come into axial bearing engagement in the locked configuration of the rotor.

An axial bearing surface 12 is formed on the rotor, on which radially mobile elementary axial bearing surfaces 13 coupled to the stator are adapted to bear in the locked configuration.

These elementary axial bearing surfaces are substantially regularly distributed in the angular direction. There are twelve of them arranged in four groups of three.

These sets of bearing surfaces 10 and 11, 12 and 13 are oriented so as to couple the rotor to the stator in both axial directions and in a transverse plane. The rotor is also immobilized against rotation to a greater or lesser degree depending on the pressure between these bearing surfaces.

The frustoconical bearing surface 12 on the rotor and the elementary bearing surfaces 13 are frustoconical as a result of which the axial alignment forces on the bearing surfaces 10, 11, 12 and 13 is proportional to the force with which the elementary bearing surfaces are urged in the radial direction.

The elementary bearing surfaces 13 are formed on the outside wall of channels 14 open in the radially outwards direction so as to define grooves 15 disposed in a plane transverse to the axis Z—Z.

Accommodated in these grooves is a locking cable 15 forming a substantially annular loop in a plane transverse to the axis Z—Z.

The channels 14 are formed at the free ends of flexible tangs or petals 17 susbtantially parallel to the axis Z—Z, being fixed at their other ends 17A to the stator 2.

The elementary bearing surfaces 13 are preferably near the junction between these channels and the tangs 17.

In the idle condition the tangs have an orientation relative to the axis Z—Z in the planes containing it such that the channels are normally spaced radially from the rotor and the elementary bearing surfaces are spaced radially from the bearing surface 12 on the rotor. In this configuration the rotor is mechanically free with respect to the stator.

In the locked configuration these tangs are bent radially towards the axis Z—Z due to the action of the cable 16, against their own elasticity. These tangs therefore constitute return spring means for the bearing surfaces 13 in the locked configuration.

Figure 7:
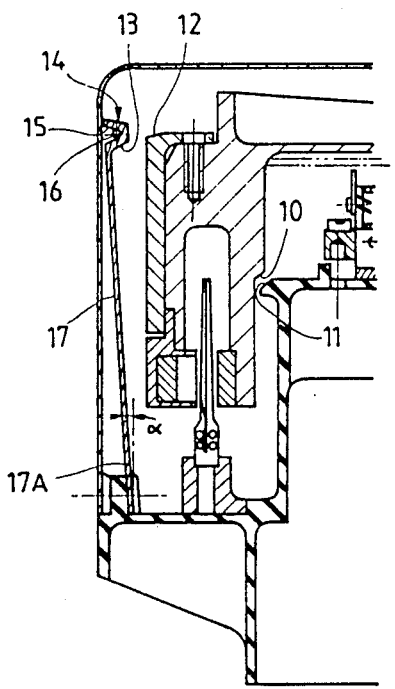
FIG. 7 is a view to a larger scale of the lefthand part VII in FIG. 1.
Figure 8:
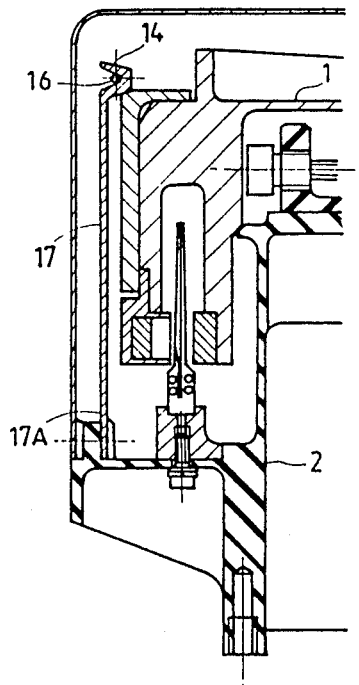
FIG. 8 is a view to a larger scale of the righthand part VIII of FIG. 1, reversed for comparison with FIG. 7, and in the locked configuration.

In the idle state these tangs are inclined by a few degrees (for example 5°), which inclination is cancelled out in the locked configuration (see FIGS. 7 and 8).

Figure 3:
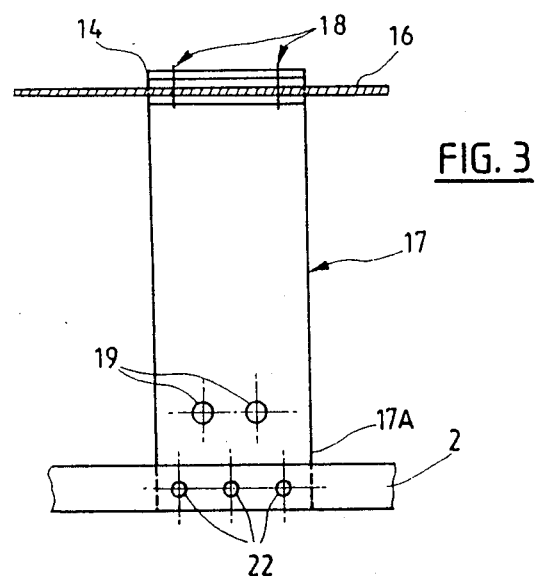
FIG. 3 is a view in elevation in the direction of the arrows III in FIGS. 1 and 2 of an elastic tang carrying a radially mobile elementary axial bearing surface.

The flexible tangs 17 are shown in elevation in FIG. 3.

At least one wire 18 is provided, aligned with the tang, to hold the cable 16 into the groove 15.

Holes 19 are provided in these tangs by virtue of which, as will emerge later, certain of them may serve to support a tensioner 20 or a cable cutting device 21.

Holes 22 are also provided for fixing the tangs to the stator by any appropriate means.

The tangs 17 are advantageously made from carbon, which makes them extremely light and extremely resilient. Thus after a long period in which they are bent these tangs return to their equilibrium position in the idle state, which enables reliable releasing of the rotor.

The elementary bearing surfaces 13 are preferably covered with a "KAPTON" type protective coating to prevent abrasion of the carbon by rubbing due to the effect of vibration arising during launch of the satellite.

The opposite bearing surface 12 is advantageously surface treated by the addition of a non-stick coating.

Figures 4, 5:
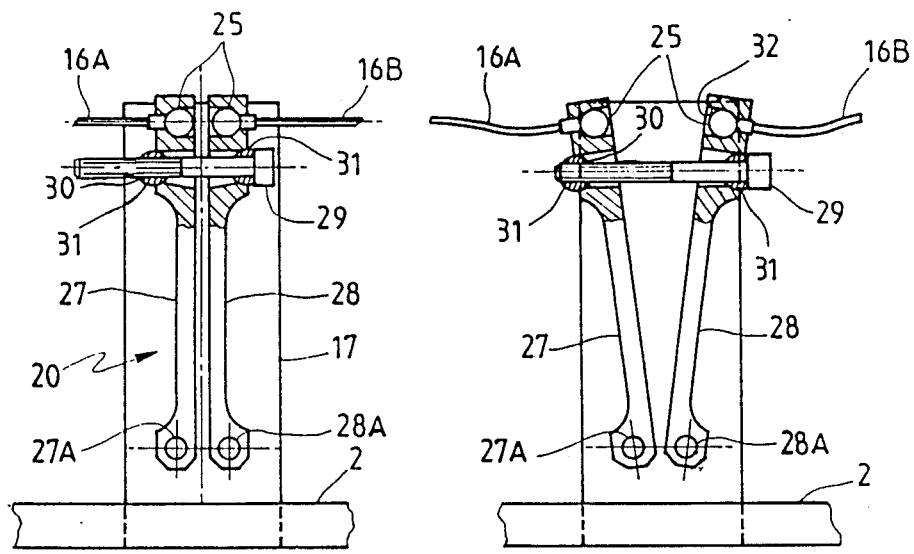
FIGS. 4 and 5 are views in elevation in the direction of the arrow IV—IV in FIG. 2 of a cable tensioner in the tensioned and non-tensioned configuration, respectively.
Figure 6:
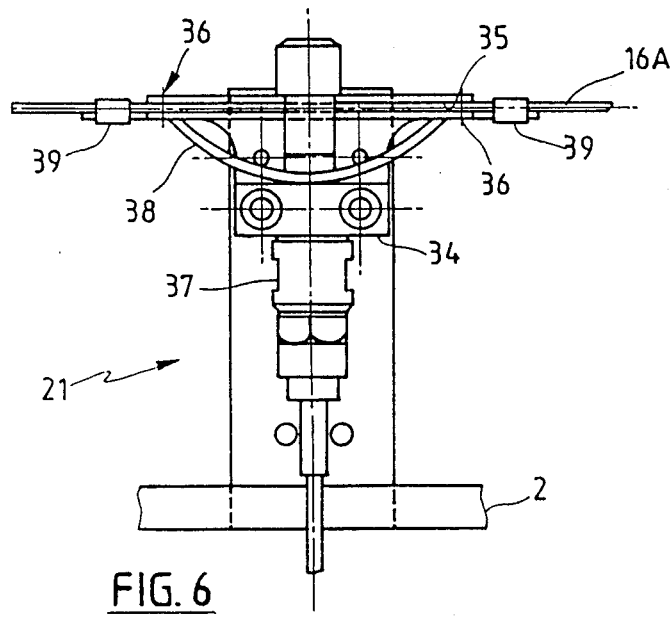
FIG. 6 is a view in elevation in the direction of the arrow VI in FIG. 2 of a cable cutter device.

The cable 16 in fact comprises two sections 16A and 16B of equal length and terminated at their ends by crimped balls 25. The two sections are joined end-to-end by these balls and by means of two diametrally opposed devices 20 and 26 at least one of which (20) is a tensioner the structure of which is shown in detail in FIGS. 4 and 5.

The tensioner 20 is carried by a flexible tang 17. It comprises a deformable compass member formed by two links 27 and 28 articulated to the tang 17 perpendicularly to the axis Z—Z on fingers 27A and 27B inserted into the aforementioned holes 19. The angle to which this compass member is opened is adjusted by a screw 29 coupled to one branch cooperating with a nut means 30 which consists of a threaded hole in a ball 31, coupled to the other branch. The screw is attached to balls 31 by nut means 30 enabling unrestricted angular movement of screw 29 and balls 31 relative to the associated branches. At the ends of the branches are provided housings 32 for retaining the balls 25 crimped to the ends of the cable sections 16A and 16B. The branches are advantageously made of titanium because of its low weight.

The device 26 is advantageously a tensioner of the same kind as the device 20. As an alternative (not shown) it may be a simple attachment member fixed to the stator and provided with housings for retaining the balls 25.

Between the diametrally opposed devices 20 and 26 are two diametrally opposed cable cutter devices 21 and 33.

The device 21 is fixed to a flexible tang 17. It comprises a light alloy cradle 34 provided with a groove 35 for holding the cable in position and wires 36 for retaining the cable. To the cradle 34 is fixed a cable cutter 37 of any appropriate known type, pyrotechnically operated, for example.

To prevent uncontrolled movement of the cable after it is cut, a retaining loop 38 is crimped by rings 39 to each side of the cable cutting area, having the excess length necessary to enable the cable section to relax to the degree considered necessary to procure release of the cable.

The device 33 is advantageously of the same kind.

To lock the rotor 1, it is placed in axial bearing engagement against the stator and then the clamping screw 29 (or each such screw) is tightened to the necessary torque.

To release the rotor the screw or screws 29 may be unscrewed manually. In space, however, the two devices 21 and 33 are operated redundantly, which releases the cable.

It goes without saying that the preceding description has been given by way of non-limiting example only and that numerous variations may be put forward by those skilled in the art without departing from the scope of the invention.

For example, the cable may be in a single piece, the device 26 serving as a simple direction changer; in this way, even if one of the devices 21 and 33 fails to function the tension in the cable is released homogeneously over all of its length.

Also, the cable cutting devices may be replaced by devices causing local escape of the cable from its groove. Finally, in this case the tensioners may be eliminated and the cable formed into a closed loop by crimping its ends together.

There is claimed:

1. Device for temporarily locking onto a stator a rotor that normally rotates on said stator on magnetic bearings, said device comprising a frustoconical bearing surface near the periphery of said rotor, a complementary frustoconical bearing surface on said stator, a plurality of radially mobile elementary bearing surfaces coupled to said stator, a second bearing surface at the periphery of said rotor, spring means radially urging said plurality of radially mobile elementary bearing surfaces away from said second bearing surface; a cable under tension shaped as an annular loop in a transverse plane radially urging said plurality of radially mobile elementary bearing surfaces in axial engagement with said second bearing surface on said rotor in a direction opposite that in which said frustoconical bearing surface on said stator applies an axial engagement force to said frustoconical bearing surface on said rotor, and a releasing device for releasing tension in said cable whereby said plurality of radially mobile elementary bearing surfaces are radially moved away from said second bearing surface by said spring means.

2. Device according to claim 1, wherein said spring means comprise elastic tangs substantially parallel to the rotation axis of said rotor fixed to said stator at one end and carrying said elementary bearing surfaces at their opposite end, said tangs having an idle position spaced from said rotor.

3. Device according to claim 2, further comprising channels accommodating said cable and wherein said elementary bearing surfaces are at the junction of said channels with said tangs.

4. Device according to claim 2, wherein said tangs are made of carbon fibers.

5. Device according to claim 2, wherein said elementary bearing surfaces and said second bearing surface on said rotor are inclined relative to a transverse plane whereby said rotor is locked with a force proportional to the tension in said cable.

6. Device according to claim 2, wherein said cable release device comprises at least one cutting device for cutting said cable in a predetermined area of said cable.

7. Device according to claim 6, further comprising a respective retaining loop crimped to said cable on each side of said area in which said cable is to be cut by said cable cutting device.

8. Device according to claim 2, further comprising a cable tensioner including two parallel branches parallel to the rotation axis of said rotor pivoted on shafts coupled to said stator and together forming a compass member substantially parallel to said rotation axis, and a screw-and-nut system for adjusting the angle to which said compass member is opened, said cable having two ends attached to free ends of respective branches of said compass member.

9. Device according to claim 2, wherein said rotor is an inertia wheel on a space satellite.

10. Device according to claim 2, wherein said cable release device comprises two cutting devices for cutting said cable in substantially diametrically facing areas of said cable.

11. Device according to claim 1, wherein said elementary bearing surfaces and said second bearing surface on said rotor are inclined relative to a transverse plane whereby said rotor is locked with a force proportional to the tension in said cable.

12. Device according to claim 1, wherein said cable release device comprises at least one cutting device for cutting said cable in a predetermined area of said cable.

13. Device according to claim 12, further comprising a respective retaining loop crimped to said cable on each side of said area in which said cable is to be cut by said cable cutting devices.

14. Device according to claim 1, further comprising a cable tensioner including two parallel branches parallel to the rotation axis of said rotor pivoted on shafts coupled to said stator and together forming a compass member substantially parallel to said rotation axis, and a screw-and-nut system for adjusting the angle to which said compass member is opened, said cable having two ends attached to free ends of respective branches of said compass member.

15. Device according to claim 1, wherein said rotor is an inertia wheel on a space satellite.

16. Device according to claim 1, wherein said cable release device comprises two cutting devices for cutting said cable in substantially diametrically facing areas of said cable.

* * * * *